United States Patent
Köhler et al.

(10) Patent No.: US 6,479,106 B2
(45) Date of Patent: Nov. 12, 2002

(54) COATED SUBSTRATES PREPARED FROM SPECIAL POLYOLS AND OXALIC ACID

(75) Inventors: Burkhard Köhler, Leverkusen (DE); Beate Baumbach, Leverkusen (DE); Christian Füssel, Tönisvorst (DE); Joachim Probst, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/008,427

(22) Filed: Nov. 13, 2001

(65) Prior Publication Data

US 2002/0119322 A1 Aug. 29, 2002

(30) Foreign Application Priority Data

Nov. 16, 2000 (DE) ......................................... 100 56 759

(51) Int. Cl.[7] ................................................. B05D 3/02
(52) U.S. Cl. .................................... 427/385.5; 428/543
(58) Field of Search ........................ 428/543; 427/385.5

(56) References Cited

U.S. PATENT DOCUMENTS 5,929,197 A * 7/1999 Kohler et al. ............... 528/274

FOREIGN PATENT DOCUMENTS

GB 1111001 4/1968

OTHER PUBLICATIONS

Patent Abstracts of Japan, vol. 013, No. 553 (C–663), Dec. 8, 1989 & JP 01 229085 A (Sekisui Chem Co., Ltd), Sept. 1989 Zusammenfassung.

Database WPI Section Ch, Week 199422 Derwent Publications Ltd., London, GB; Class A14, AN 1994–180837 XP00219839 & SU 467 614 A (Nikonorov V I) Jan. 23, 1993 Zusammenfassung.

* cited by examiner

*Primary Examiner*—Erma Cameron
(74) *Attorney, Agent, or Firm*—Joseph C. Gil; Thomas W. Roy

(57) ABSTRACT

The present invention relates to coated substrates obtained by stoving mixtures containing
A) 1 part by weight of ester group-free polyols having an OH content of 1 to 10%,
B) 0.05 to 1 part by weight of oxalic acid and
C) 0.2 to 5 parts by weight of organic solvents,
at temperatures of 120° C. to 250° C. and a stoving time of 1 to 100 min on substrates. The present invention also relates to a process for preparing the coated substrates.

4 Claims, No Drawings

COATED SUBSTRATES PREPARED FROM SPECIAL POLYOLS AND OXALIC ACID

BACKGROUND OF THE INVENTION

1. Field of the Invention

The present invention relates to coating substrates produced by stoving a mixture of polyols, which contain no ester groups, with oxalic acid and to a process for the production thereof.

2. Description of the Prior Art

As is known, polyols may be crosslinked with amino resins or blocked isocyanates at relatively high temperatures (c.f. Ullmann's Encyclopedia of Industrial Chemistry, Fifth Edition, volume A18, pp. 404–405 and 414–418). Unwanted substances, such as formaldehyde or blocking agents, are eliminated during this operation.

It is an object of the present invention to provide stoving lacquers which primarily eliminate harmless products, such as water.

This object may be achieved in accordance with the present invention by using mixtures of ester group-free polyols and oxalic acid, which crosslink at elevated temperatures to yield solvent-resistant, hard coatings.

SUMMARY OF THE INVENTION

The present invention relates to coated substrates obtained by stoving mixtures containing
A) 1 part by weight of ester group-free polyols having an OH content of 1 to 10%,
B) 0.05 to 1 part by weight of oxalic acid and
C) 0.2 to 5 parts by weight of organic solvents, at temperatures of 120° C. to 250° C. and a stoving time of 1 to 100 min on substrates.

The present invention also relates to a process for preparing the coated substrates.

DESCRIPTION OF THE INVENTION

The stoving lacquer mixtures may be applied onto substrates by knife coating, spraying, flooding or dipping. Stoving then proceeds at temperatures of 120° C. to 250° C. in the presence of air or inert gas for a period of 1 to 100 min.

Ester group-free polyols A) to be used according to the invention are copolymers prepared from ester group-free vinyl monomers (such as styrene, 3- or 4-methylstyrene, acrylonitrile, alpha-methylstyrene, cyclohexyl vinyl ether, butyl vinyl ether or methyl vinyl ether) with ester group-free, OH-functional, vinyl copolymers (such as allyl alcohol, allyl alcohol hydroxyalkylated with ethylene oxide or propylene oxide, hydroxymethylnorbornene trimethylolpropane monoallyl ether, glycerol monoallyl ether, hydroxyethyl vinyl ether, hydroxybutyl vinyl ether or cyclohexanedimethanol monovinyl ether). Polyols A) are preferably in the form of OH-terminated prepolymers that may be obtained by reacting the preceding polyols with diisocyanates, such as bis(4-isocyanatocyclohexyl)methane, 4,4'-diisocyanatodiphenyl-methane, tolylene diisocyanate, isophorone diisocyanate and hexamethylene diisocyanate.

According to the invention, it is also possible to copolymerize ester group-free monomers with allyl glycidyl ether, such that the epoxy ring is opened by water, monoalcohols or secondary amines and then to optionally form an OH-terminated prepolymer by reacting with diisocyanates. The reaction products of polyols, such as trimethylolpropane, trimethylolethane or pentaerythritol, or the reaction products thereof with ethylene oxide or propylene oxide, which have been pre-extended with diisocyanates to form OH-terminated prepolymers may also be used according to the invention as component A).

Polyols protected by ketal groups, such as the monoketals of pentaerythritol with acetone, cyclohexanone or benzaldehyde, or the diketals of sugar alcohols, such as sorbitol or mannitol, with acetone, cyclohexanone or benzaldehyde, may also be reacted with diisocyanates to yield polycondensation products, wherein the ketal protective groups are subsequently eliminated.

Preferably, Component A) contains urethane groups.

Component B) is oxalic acid, which, before mixing with the other components, is preferably predissolved in a dipolar-aprotic solvent, preferably N-methylpyrrolidone, dimethylacetamide and/or dimethylformamide, to preferably provide a 10 to 40 wt. % solution.

Solvents C) include aromatic hydrocarbons such as toluene, xylene or mixtures of alkylated aromatics; ester-containing solvents such as butyl acetate, methoxypropyl acetate, methoxyethyl acetate or ethyl acetate; ether-containing solvents such as ethylene glycol dimethyl ether, ethylene glycol diethyl ether, diethylene glycol dimethyl ether, dioxane or tetrahydrofuran; and dipolar-aprotic solvents such as N-methylpyrrolidone, dimethylacetamide, dimethylformamide, dimethyl sulfoxide, N-methylcaprolactam, dimethyl sulfone or sulfolane. The dipolar-aprotic solvents are preferably used to predissolve the oxalic acid.

Optional components D) include pigments and known lacquer additives.

Components A) to D) may, in principle, be mixed in any desired order at temperatures of below 50° C. with shear (e.g. stirring). The oxalic acid is preferably predissolved in a dipolar-aprotic solvent, wherein this solvent may be added to the other components when desired.

The mixture of components A) to D) is stable at room temperature for at least 2 weeks, which means that a storage-stable single component coating composition may be formulated. The solution of oxalic acid in a dipolar-aprotic solvent may, however, also be added immediately before application.

In addition to oxalic acid, it is also possible to add further curing agents such as amino resins, blocked isocyanates or preferably epoxides in quantities of 1 to 20 parts by weight, based on 100 parts by weight of the mixture of A) to D).

The coatings according to the invention may be used on any substrates that are stable at above 160° C., such as metals, glass, high temperature plastics or mineral bases. The present invention accordingly also relates to substrates coated with the coating compositions according to the invention.

The coatings are characterised by elevated hardness and solvent resistance. During stoving, only the solvents and water (from esterification of the OH groups with the oxalic acid) are released. No products, such as formaldehyde or isocyanate blocking agents, are released.

The invention is further illustrated but is not intended to be limited by the following examples in which all parts and percentages are by weight unless otherwise specified.

EXAMPLES

Example 1

270 g of SAA (styrene/allyl alcohol copolymer; molecular weight Mn =1600, OH content 6%) was combined with 200 g of MPA (methoxypropyl acetate), 6.5 g of MDI (4,4'-diisocyanatodiphenylmethane) in 34 g of NMP (N-methylpyrrolidone) were added and the mixture was heated to 120° C. for 4 hours.

100 parts by weight of this formulation were combined with 30 parts by weight of a 33% solution of oxalic acid in NMP.

Example 2

300 g of SAA in 286 g of MPA were combined with 15.1 g of HDI (hexamethylene diisocyanate) and the mixture was heated to 120° C. for 4 hours.

100 parts by weight of this formulation were combined with 30 parts by weight of a 33% solution of oxalic acid in NMP.

Example 3

300 g of SAA in 286 g of MPA were combined with 20 g of IPDI (isophorone diisocyanate) and the mixture heated to 120° C. for 4 hours.

100 parts by weight of this formulation were combined with 30 parts by weight of a 33% solution of oxalic acid in NMP.

Example 4

300 g of SAA in 286 g of MPA were combined with 17.7 g of bis-(4-isocyanatocyclohexyl)methane and the mixture was heated to 120° C. for 4 hours.

100 parts by weight of this formulation were combined with 30 parts by weight of a 33% solution of oxalic acid in NMP.

The mixtures according to Examples 1 to 4 were knife coated at a wet film thickness of 180 μm onto a glass sheet and stoved for 10, 20 and 30 min at 160° C. The following pendulum hardnesses were obtained (König method [s]):

All of the coatings were resistant to 100 MEK double rubs.

Comparative Example

A mixture of 40 g of hydroxyethyl methacrylate, 40 g of styrene, 20 g of butyl acrylate, 80 g of MPA and 0.5 g of azobisisobutyronitrile was heated to 65° C. for 24 hours and to 120° C. for 1 hour.

The mixture was combined with 54 g of a 33% solution of oxalic acid in NMP.

Stoving was performed at 160° C. for 30 minutes. The film was tacky and soluble in MEK.

The OH group was attached to the coating resin via an ester group and the example demonstrates that this prevents the mixture from crosslinking.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coated substrate obtained by stoving a mixture comprising

A) 1 part by weight of an ester group-free polyol having an OH content of 1 to 10%, B) 0.05 to 1 part by weight of oxalic acid and C) 0.2 to 5 parts by weight of an organic solvent, at a temperature of 120° C. to 250° C. and a stoving time of 1 to 100 min on a substrate.

2. The coated substrate of claim 1 wherein polyol A) contains urethane groups.

3. A process for the production of a coated substrate which comprises applying to a substrate a mixture comprising A) 1 part by weight of an ester group-free polyol having an OH content of 1 to 10%, B) 0.05 to 1 part by weight of oxalic acid and C) 0.2 to 5 parts by weight of an organic solvent, and stoving the coated substrate at a temperature of 120° C. to 250° C. for 1 to 100 minutes.

4. The process of claim 3 wherein polyol A) contains urethane groups.

* * * * *

UNITED STATES PATENT AND TRADEMARK OFFICE
CERTIFICATE OF CORRECTION

PATENT NO. : 6,479,106 B2
APPLICATION NO. : 10/008427
DATED : November 12, 2002
INVENTOR(S) : Burkhard Köhler et al.

It is certified that error appears in the above-identified patent and that said Letters Patent is hereby corrected as shown below:

IN THE SPECIFICATION:
At column 3, after line 37, following the sentence: "The following pendulum hardnesses were obtained (König method[s]):", insert the following table:

|         | Example 1 | Example 2 | Example 3 | Example 4 |
|---------|-----------|-----------|-----------|-----------|
| 10 min  | 166       | 172       | 136       | 174       |
| 20 min  | 177       | 180       | 166       | 174       |
| 30 min  | 180       | 182       | 144       | 177       |

Signed and Sealed this

Seventeenth Day of October, 2006

JON W. DUDAS
*Director of the United States Patent and Trademark Office*